United States Patent
Nakai et al.

(10) Patent No.: US 7,307,964 B2
(45) Date of Patent: Dec. 11, 2007

(54) CONTACTLESS COMMUNICATION SYSTEM AND DATA CARRIER USED FOR THE SAME

(75) Inventors: Yuichiro Nakai, Kobe (JP); Shota Nakashima, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1109 days.

(21) Appl. No.: 10/274,913

(22) Filed: Oct. 22, 2002

(65) Prior Publication Data

US 2003/0091005 A1    May 15, 2003

(30) Foreign Application Priority Data

Nov. 9, 2001    (JP) ............................. 2001-343943

(51) Int. Cl.
 *H04B 7/212*    (2006.01)
(52) U.S. Cl. ...................... 370/278; 370/336; 370/442
(58) Field of Classification Search ................ 370/278, 370/282, 328, 329, 336, 337, 347, 442, 252; 375/220–222
 See application file for complete search history.

(56) References Cited

U.S. PATENT DOCUMENTS

| | | | |
|---|---|---|---|
| 5,539,394 A | 7/1996 | Cato et al. ................ | 340/10.32 |
| 5,698,837 A | 12/1997 | Furuta ......................... | 235/492 |
| 6,002,344 A | 12/1999 | Bandy et al. ............... | 340/10.2 |
| 6,069,886 A * | 5/2000 | Ayerst et al. ................ | 370/336 |
| 6,263,016 B1 * | 7/2001 | Bellenger et al. ........... | 375/222 |

FOREIGN PATENT DOCUMENTS

| | | |
|---|---|---|
| EP | 0 862 133 A1 | 9/1998 |
| EP | 0 866 401 A2 | 9/1998 |
| JP | 04-362797 | 12/1992 |
| JP | 10222623 A | 8/1998 |
| JP | 11-272815 | 10/1999 |
| JP | 11-306297 | 11/1999 |
| WO | WO98/22903 | 5/1998 |
| WO | WO99/65168 | 12/1999 |

* cited by examiner

*Primary Examiner*—John Pezzlo
(74) *Attorney, Agent, or Firm*—Steptoe & Johnson LLP

(57) ABSTRACT

To provide a contactless communication system that can reduce a time required to complete an identification of all data carriers that exist around a reader/writer and thus attempt to speed up its processing. According to the contactless communication system, multiple data carriers detect a response requesting command from an access device and send back an individual response signal for one-bit information to the access device at a time that is ordered based on a portion of each carrier's identification information, and the access device monitors individual slots for the response signals and determines that detection of the presence of data carriers is completed when it has obtained individual signals from the data carriers, thereby reducing the time required to complete the identification of all data carriers.

6 Claims, 9 Drawing Sheets

FIG. 9
PRIOR ART
(a)
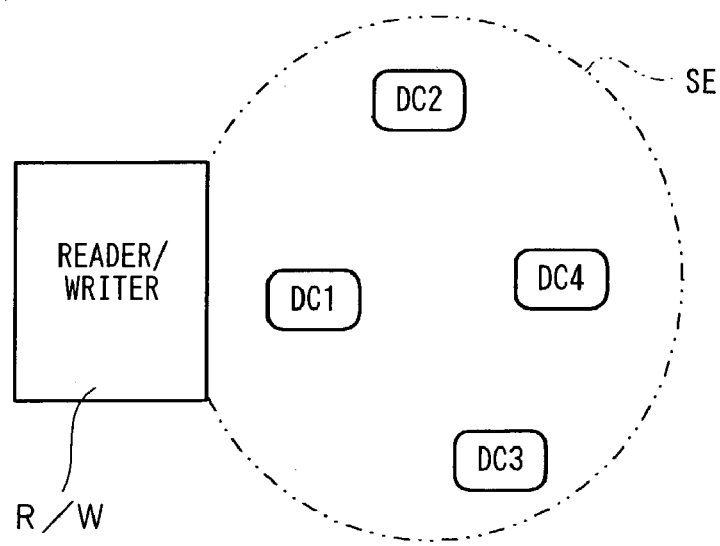
(b)
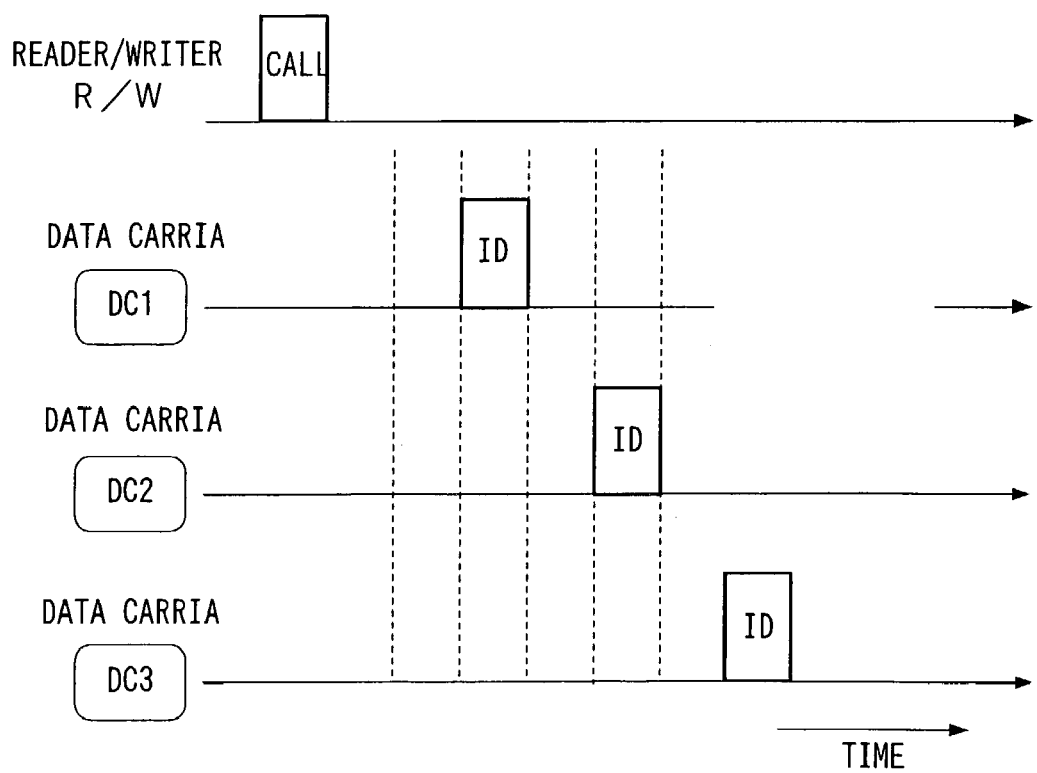

CONTACTLESS COMMUNICATION SYSTEM AND DATA CARRIER USED FOR THE SAME

FIELD OF THE INVENTION

The present invention relates to a contactless identification system consisting of a data carrier and a reader, and particularly to a contactless communication system and data carriers that enable data carriers to be identified when multiple data carriers exist in a communication area.

BACKGROUND OF THE INVENTION

Conventionally, such a system has been required that identifies articles and persons in fields such as management of distribution, management of products at plants, management of administration at gates in ski areas, and automatic ticket gates.

A contactless communication system thus has been proposed that provides a memory unit (a data carrier) having memory to a object to be identified and writes necessary information to the data carrier externally through data transfer so that the information can be read as required.

As shown in FIG. 9A, in a contactless communication system, multiple data carriers DC1 to DC4 may enter the communication area SE of a reader/writer R/W. Even in such a case, each data carrier need to be identified for normal data communication.

In a conventional system, each data carrier is given a unique identification number in advance, and a reader/writer R/W sends commands for getting identification numbers and receives data on identification numbers from the data carriers DC1 to DC4 in order to identify data carriers DC1 to DC4.

At this time, if multiple data carriers are present in a communication area and data carriers DC1 to DC4 simultaneously respond, the responses may not be conveyed to the reader/writer R/W normally due to interference.

Accordingly, as shown in FIG. 9B, there is a known identification system in which, after receiving the command, each of the data carriers DC1 to DC4 responds after a time period that is defined as a multiple of a certain time period as a unit so that responses from data carriers DC1 to DC4 would not occur at a time.

The conventional method of identifying multiple data carriers has adopted a system which sends back all bits of identification information held by a data carrier in response to a request for response from a reader/writer. This system, however, has such a defect that processing for identification is time consuming since all bits of data is sent back, although all bits of data for identification information is not required to identify each data carrier if the number of bits for identification information is large enough compared to the number of data carriers to be identified that exist around a reader/writer.

In addition, the above-mentioned system in which, upon reception of a command for requesting a response, a data carrier will respond after a time period that is defined as a multiple of a certain time as a unit has a defect that its processing is inefficient since an extra time of one frame is required at the end to confirm the completion of identification.

An object of the present invention is to provide a contactless communication system that can reduce the time required for completing identification of all of multiple data carriers that exist around a reader/writer and attempt the speed-up of its processing.

DISCLOSURE OF THE INVENTION

A contactless communication system according to the present invention is a contactless communication system having a plurality of data carriers and an access device for accessing the data carriers, wherein each of the data carriers detects a response requesting command from the access device and sends back an individual response signal for one-bit information at a time ordered based on a portion of its identification information, and the access device monitors individual slots for the response signals and determines that detection of the presence of data carriers is completed when it has obtained individual signals from the data carriers.

The data carrier detects a response requesting command from an access device and transmits an individual signal for one-bit information at a time ordered based on a portion of its identification information.

Further, the contactless communication system is configured such that the access device monitors individual slots for the response signals and determines that detection of the presence of data carriers is completed when it has obtained individual signals from the plurality of data carriers, transmits to a data carrier, whose presence it has detected, a response halt request added with a new identification number that is generated based on information on a slot time for a response, and transmits the response request again to a data carrier whose presence it has not detected; and the data carriers detect the response halt request and store the identification number fixedly.

Further, the data carrier detects a response requesting a command from an access device and transmits an individual signal for one-bit information at a time ordered based on a portion of its identification information, as well as detects a response halt request added with a new identification number that is transmitted by the access device to a data carrier, whose presence has been recognized with the individual signal, and stores the new identification number fixedly.

Another contactless communication system according to the present invention is a contactless communication system having a plurality of data carriers and an access device for accessing the data carriers, wherein each of the data carriers detects a response requesting command from the access device in a particular slot defined based on a portion of each data carrier's identification information among slots ordered within a frame, transmits an individual signal in an individual slot section that is a portion of the particular slot, and transmits a common signal in a fixed common slot that is a different section from the individual slot section of the same particular slot and in common slot sections of other slots except the particular slot until it detects a response halt command for it from the access device; and the access device transmits the response requesting command until it recognizes the presence of all of the data carriers, monitors individual slots for the response signals, transmits a specific response halt command to a data carrier whose presence has been recognized based on the individual signal from the data carrier, and determines that an abnormal condition in communication has occurred if it cannot receive signals in common slots by the last slot.

The data carrier detects a response requesting command from the access device in a particular slot defined based on a portion of each data carrier's identification information among slots ordered within a frame and transmits an individual signal in an individual slot section that is a portion of the particular slot, as well as transmits a common signal in a fixed common slot that is a different section from the individual slot section of the same particular slot and in common slot sections of other slots except the particular slot until it detects a response halt command for it from the access device.

Still another contactless communication system according to the present invention is a contactless communication system having a plurality of data carriers and an access device for accessing the data carriers, wherein each of the data carriers detects a response requesting command from the access device in a particular slot defined based on a portion of each data carrier's identification information among slots ordered within a frame, transmits an individual signal in an individual slot section that is a portion of the particular slot and transmits a common signal in a fixed common slot that is a different section from the individual slot section of the same particular slot and in common slot sections of slots between the beginning of the frame and the particular slot until it detects a response halt command for it from the access device (reader/writer 1); and the access device transmits the response requesting command until it recognizes the presence of all of the data carriers, monitors individual slots for the response signals, transmits a specific response halt command to a data carrier whose presence has been recognized based on the individual signal from the data carrier, and monitors common slots in response signals to determine that detection of the presence of the data carriers is completed when it cannot receive signals in common slots by the last slot.

The data carrier detects a response requesting command from the access device in a particular slot defined based on a portion of each data carrier's identification information among slots ordered within a frame and transmits an individual signal in an individual slot section that is a portion of the particular slot, as well as transmits a common signal in a fixed common slot that is a different section from the individual slot section of the same particular slot and in common slot sections of slots between the beginning of the frame and the particular slot until it detects a response halt command for it from the access device.

A communication method for the contactless communication system according to the present invention is a method wherein when an access device identifies and communicates with a plurality of data carriers in a communication area, each of the data carriers detects a response requesting command from the access device and sends back an individual response signal for one-bit information at a time ordered based on a portion of its identification information; and that the access device monitors individual slots for the response signals and determines that detection of the presence of data carriers is completed when it has obtained individual signals from the plurality of data carriers.

The access device transmits a response halt request that is added with a new identification number generated based on information on a slot time for a response to a data carrier whose presence has been detected, and transmits the response request again to a data carrier whose presence has not been detected; and the each of the data carriers detects the response halt request and stores the identification number fixedly.

Another communication method for the contactless communication system according to the present invention is a method wherein each of the data carriers detects a response halt request from the access device and transmits an individual signal in an individual slot section that is a portion of a particular slot defined based on a portion of each data carrier's identification information among slots ordered within a frame, as well as transmits a common signal in a fixed common slot that is a different section from the individual slot section of the same particular slot and in common slot sections of other slots except the particular slot within the same frame until it detects a response halt command for it from the access device; and the access device transmits the response requesting command until it recognizes the presence of all of the data carriers, monitors individual slots for the response signals, transmits a specific response halt command to a data carrier whose presence has been recognized based, on the individual signal from the data carrier, and determines that an abnormal condition in communication has occurred if it cannot receive signals in common slots by the last slot within a frame.

Still another communication method for the contactless communication system according to the present invention is a method wherein each of the data carriers detects a response requesting command from the access device and transmits an individual signal in an individual slot section that is a portion of a particular slot defined based on a portion of each data carrier's identification information among slots ordered within a frame, as well as transmits a common signal in a fixed common slot that is a different section from the individual slot section of the same particular slot and in a common slot section of slots between the beginning of the frame and the particular slot; and the access device transmits the response requesting command until it recognizes the presence of all of the data carriers, monitors individual slots for the response signals, transmits a specific response halt command to a data carrier whose presence has been recognized based on the individual signal from the data carrier, and monitors a common slot in response signals to determine that detection of the presence of data carriers is completed when it cannot receive signals in common slots by the last slot.

BRIEF DESCRIPTION OF THE DRAWINGS

FIG. 9 illustrates an identification area of a reader/writer and physical relationships among multiple data carriers, and a conventional method of identifying data carriers in a conventional contactless communication system.

DESCRIPTION OF THE EMBODIMENTS

In the following, embodiments of the present invention will be described based on FIGS. 1 to 8.

Embodiment 1

Figure 1:
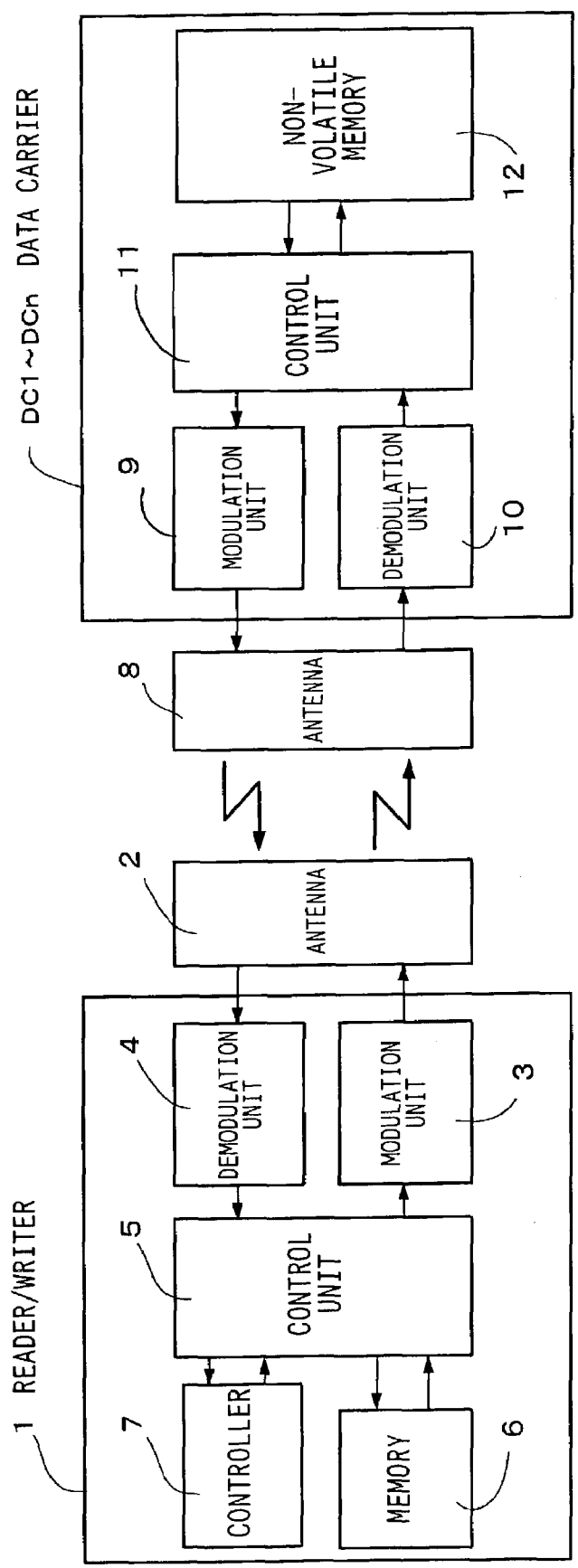
FIG. 1 is a block diagram of a contactless communication system in embodiment 1 of the present invention.
Figure 2:
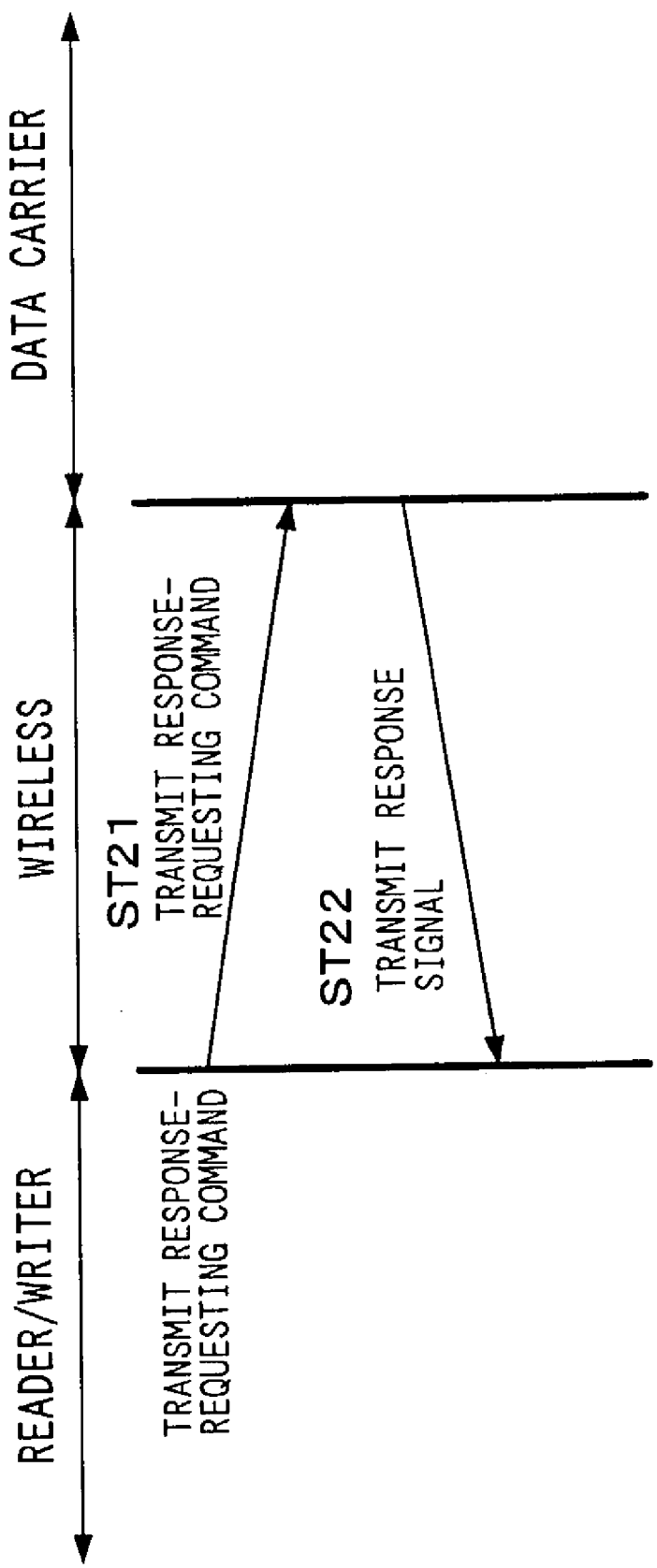
FIG. 2 is a flow chart illustrating operations of a reader/writer and a data carrier in embodiment 1.
Figure 3:
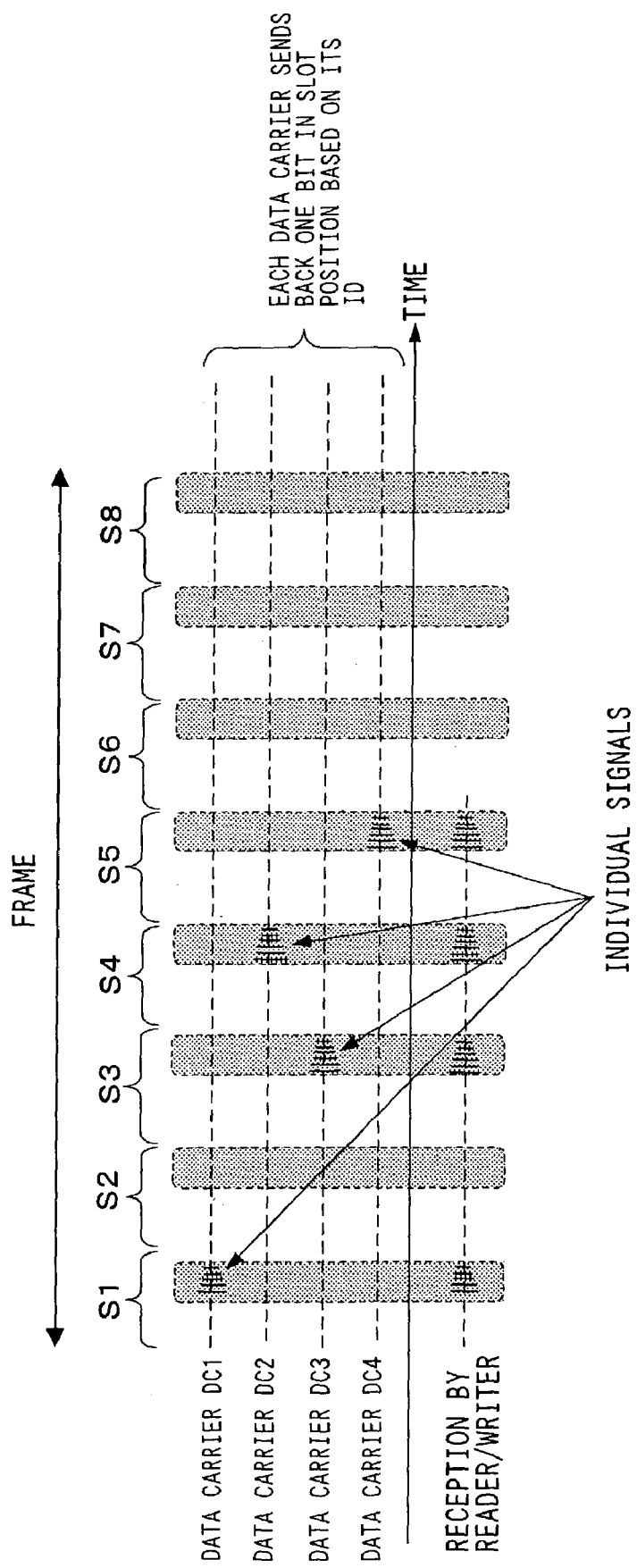
FIG. 3 shows a waveform illustrating an output from a reader/writer, and an output from each data carrier and its received data in identifying data carriers in embodiment 1.

FIGS. 1 to 3 show embodiment 1 of the present invention.

As shown in FIG. 1, a contactless communication system consists of a plurality of data carriers DC1 to DCn and a reader/writer 1 as an access device for accessing the data carriers DC1 to DCn.

The reader/writer 1 consists of an antenna 2 for receiving and transmitting data signals, a modulation unit 3 for modulating transmitted data, a demodulation unit 4 for demodulating data, a control unit 5 for controlling modulated/demodulated data, memory unit 6 for allowing controlled data to be read and written, and a controller 7 for inputting and outputting data.

Each of the data carriers DC1 to DCn consists of an antenna 8 for converting a portion of a magnetic field radiated as data by the reader/writer 1 into an electrical signal, a modulation unit 9 for modulating data, a demodulation unit 10 for demodulating data, a control unit 11 for controlling modulation/demodulation, and a non-volatile memory unit 12 for executing controlled reading and writing of data, as provided on a predetermined substrate or film.

The communication method between the reader/writer 1 and the data carrier DC1 (to DCn) will be now described.

Upon reception of an instruction signal such as a call signal and a signal requesting processing from the controller 7, the control unit 5 accesses the memory 6, sends a control instruction signal to the modulation unit 3, and transmits a modulated signal to the data carrier DC1 (to DCn) via the antenna 2.

The modulated signal transmitted by the reader/writer 1 is received by the antenna 8 of the data carrier DC1 (to DCn) to be demodulated at the demodulation unit 10, and the demodulated signal is sent to the control unit 11 as a control instruction signal.

The control instruction signal is executed by the non-volatile memory unit 12 and sent as a signal such as a response signal or a result responding signal to the modulation unit 9, and the modulated signal is transmitted to the reader/writer 1 via the antenna 8.

Upon reception of the modulated signal transmitted by the data carrier DC1 (to DCn) at the antenna 2, the reader/writer 1 demodulates the signal at the demodulation unit 4 and sends the demodulated signal to the control unit 5. The signal sent to the control unit 5 is sent to the controller through an access to the memory unit 6. The communication between the reader/writer 1 and the data carriers DC1 to DCn is made in such a way.

A contactless communication system using multiple data carriers DC1 to DCn will be described with FIGS. 2 and 3.

FIG. 2 shows a flow of operation between the data carriers DC1 to DCn and the reader/writer 1 in embodiment 1.

As shown, the reader/writer 1 first broadcasts response requesting commands to the data carriers DC1 to DCn (step ST21). The response requesting command describes the number of time slots to be used according to the expected number (n) of data carriers DC1 to DCn.

For easier understanding, it is assumed that each of the data carriers DC1 to DCn has ID data of 64 bits in total and three bits of the ID data is utilized for determination of a slot, and eight slots exist.

On receiving the command, each of the data carriers DC1 to DCn selects a slot among eight slots based on 3-bit data as a portion of its ID data and sends a signal of only one bit to the reader/writer 1 (step ST22).

FIG. 3 shows a time chart for the process above.

This drawing assumes that the number of the data carriers is four: n=4 (i.e. DC1 to DC4). An uplink transmission frame from the data carriers DC1 to DC4 to the reader/writer 1 consisting of slots S1 to S8 arranged in an order from the start of transmission, each of the data carriers DC1 to DC4 transmits a one-bit signal in a time slot selected by itself in response to a read-command from the reader/writer 1.

Here, the data carrier DC1 transmits a one-bit signal in the slot S1, the data carrier DC2 transmits a one-bit signal in the slot S4, the data carrier DC3 transmits a one-bit signal in the slot S3, and the data carrier DC4 transmits a one-bit signal in the slot S5: no data carriers share a slot.

In such a manner, in the uplink transmission frame from the data carriers DC1 to DC4 to the reader/writer 1, each of the data carriers DC1 to DC4 sends back only information of one bit instead of sending its ID data in an individual slot in which only the carrier transmits so that the reader/writer 1 detects the presence of each data carrier.

The reader/writer 1 is configured to monitor individual slots for the response signals and determine that detection of the presence of data carriers is completed when individual signals from the data carriers DC1 to DC4 have been obtained.

As a result, it is possible to reduce the time required to complete reading of data by a transmission time that is equivalent to the number of bits for ID data minus one bit, and thus to attempt to speed up processing, compared to the conventional practice where all data carriers send back their ID data.

Embodiment 2

Figure 4:
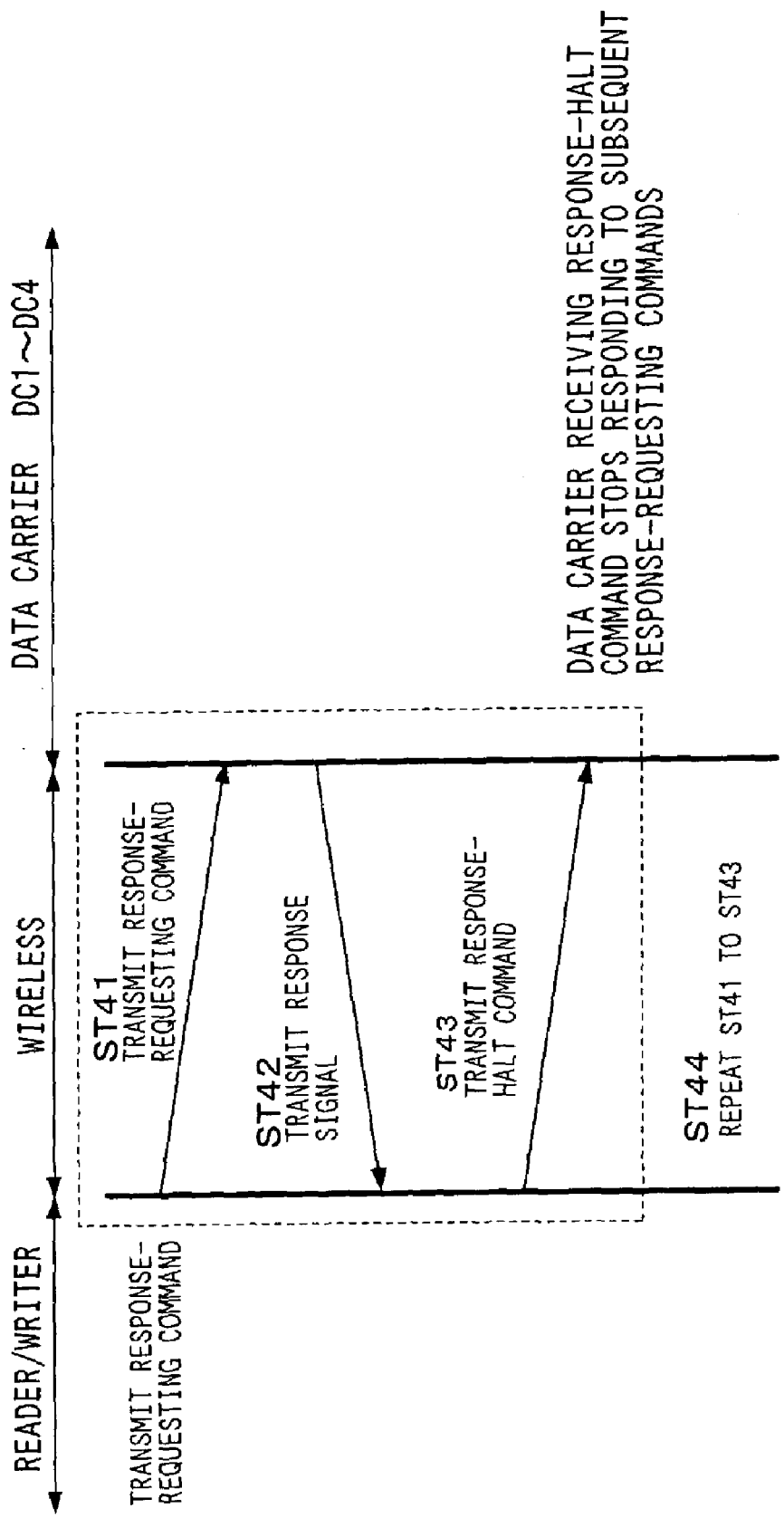
FIG. 4 is a flow chart illustrating operations of a reader/writer and a data carrier in embodiment 2 of the present invention.

FIG. 4 shows embodiment 2 of the present invention.

The basic configuration of the contactless communication system is the same as FIG. 1.

A contactless communication system using multiple data carriers will be described with FIG. 4.

FIG. 4 shows a flow of an operation between the data carriers DC1 to DCn and the reader/writer 1.

Each of the data carriers DC1 to DCn is configured to detect a response requesting command from the reader/writer 1 to transmit an individual signal for one-bit information at a time ordered based on a portion of its identification information, detect a response halt request added with a new identification number that is transmitted by the reader/writer 1 to a carrier whose presence has been recognized with the individual signal, and store the new identification number fixedly.

First, the reader/writer 1 broadcasts a response requesting command to each of the data carriers DC1 to DCn (step ST41). The response requesting command describes the number of time slots to be used according to the (expected) number of data carriers DC1 to DCn.

For easier understanding, it is assumed that each data carrier has ID data of 64 bits in total and three bits of the ID data is used for determining a slot, and eight slots exist.

Upon reception of the command, every data carrier DC1 to DCn selects a slot from among the eight time slots based on three-bit data as a portion of its ID data and transmits an only one-bit signal to the reader/writer 1 (step ST42).

If individual signals have not collided with each other, the reader/writer 1 then transmits response halt commands to the data carriers DC1 to DCn based on the slot position information, and utilizes the position information as destination information for a data carrier whose response it wants to stop and halts the response from a particular data carrier (step ST43).

Here, a response halt command transmitted by the reader/writer 1 being added with a new identification number, any of the data carriers DC1 to DCn is configured to, on detecting the response halt request from the reader/writer 1, store a new identification number fixedly and use it as its identification number for subsequent transmission to the reader/writer 1.

The reader/writer 1 is configured to transmit a response halt request added with a new identification number that is generated based on information on a slot time for response to a data carrier whose presence it has detected, and to transmit the response request again to a data carrier whose presence it has not detected yet.

If execution of step ST42 results in a collision of signals, the process from step ST41 to step ST43 is repeated (step ST44) with different three bits of the ID data being used for determining a slot.

In embodiment 2, in the uplink transmission frame from the data carriers DC1 to DCn to the reader/writer 1, each of the data carriers DC1 to DCn sends back only one-bit information instead of sending its ID data in an individual slot in which only the data carrier transmits so that the reader/writer 1 can detect the presence of the data carriers, and detected information on a slot position can be utilized as destination information for a data carrier for the next response halt signal to be transmitted.

As a result, it is possible to reduce time required to complete reading of data by a transmission time that is equivalent to the number of bits for ID data minus one bit, compared to the conventional practice where each data carrier sends back entire ID data, and also to reduce time required for requesting responses to be halted by a transmission time that is equivalent to the number of bits for ID data minus some bits (in this case, three bits) compared to identifying a data carrier based on all of its ID data as done in the conventional method. Thus, speed-up of processing is made possible.

Embodiment 3

Figure 5:
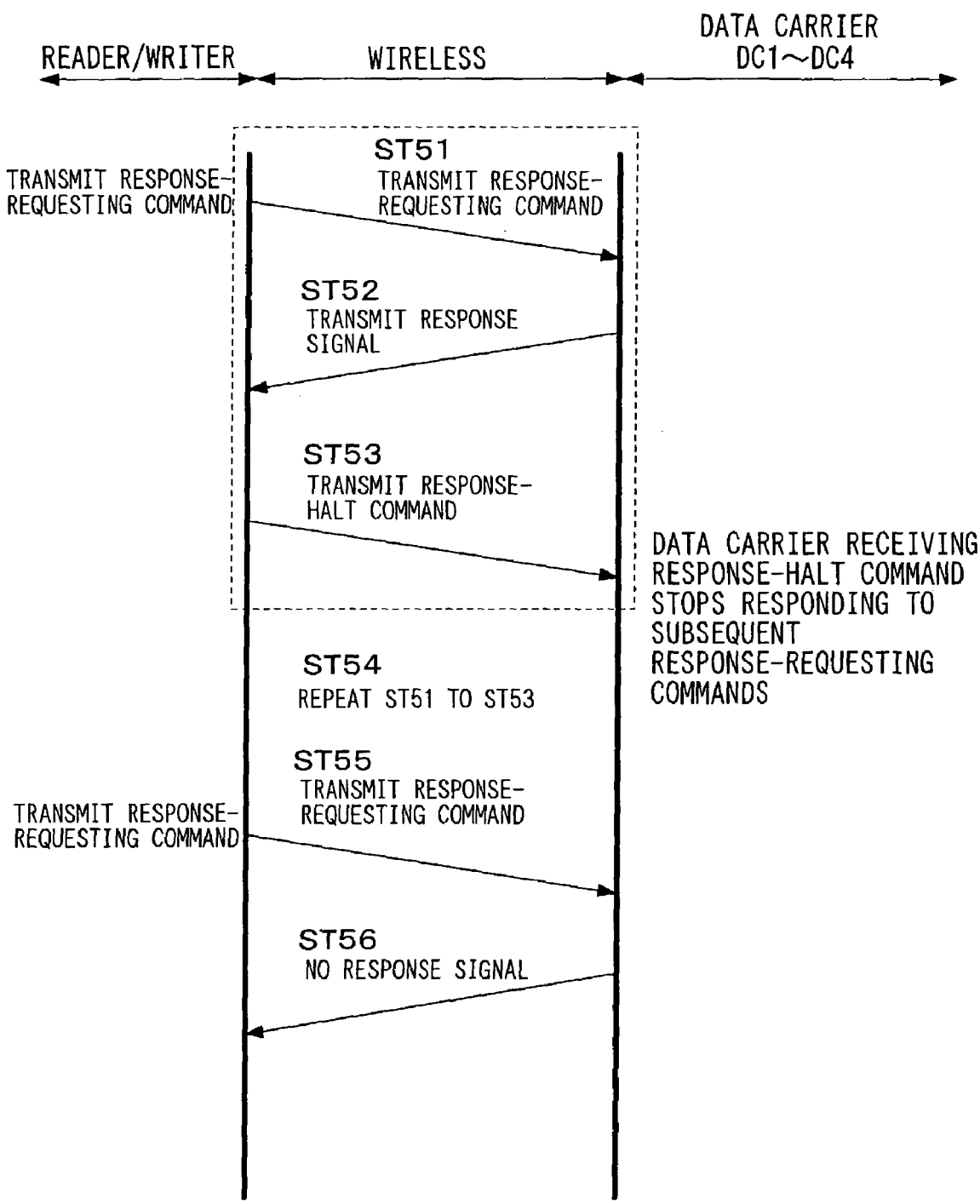
FIG. 5 is a flow chart illustrating operations of a reader/writer and a data carrier in embodiment 3 of the present invention.
Figure 6:
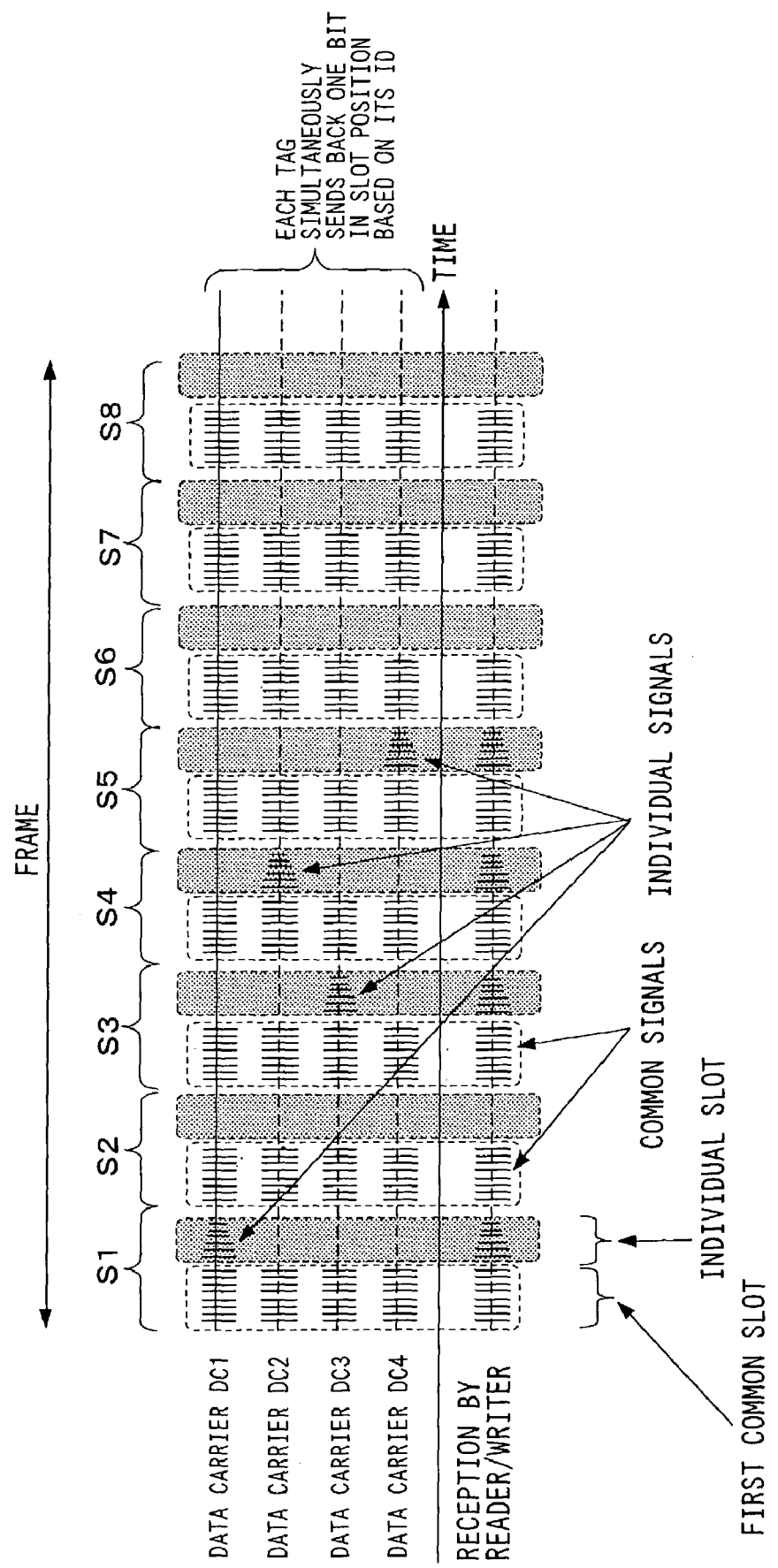
FIG. 6 shows a waveform illustrating an output from a reader/writer, and an output from each data carrier and its received data in identifying data carriers in embodiment 3.

FIGS. 5 and 6 show embodiment 3 of the present invention.

The basic configuration of the contactless communication system is the same as FIG. 1.

A contactless communication system using multiple data carriers will be described with FIG. 4.

FIG. 5 shows a flow of operation between the data carriers DC1 to DCn and the reader/writer 1 in the embodiment.

Each of the data carriers DC1 to DCn is configured to detect a response requesting command from the reader/writer 1 in a particular slot that is defined based on a portion of each carrier's identification information among slots S1 to S8 ordered in a frame, and transmit an individual signal in an individual slot section that is a portion of the particular slot, also to transmit common signals in a fixed common slot section that is a different section from the individual slot section in the same particular slot and in common slot sections in other slots except the particular slot until it detects a response halt command to it from the reader/writer 1.

The reader/writer 1 first broadcasts a response requesting command to each of the data carriers DC1 to DCn (step ST51). The command describes the number of time slots to be used according to the (expected) number of the data carriers DC1 to DCn.

For easier understanding, it is assumed that each data carrier has ID data of 64 bits in total and three bits of the ID data is used for determining a slot, and eight slots exist. Also, each of the eight slots further consists of an individual slot and a common slot.

On receiving the response requesting command, each of the data carriers DC1 to DCn transmits simultaneously a one-bit common signal fixed the same for all carriers in common slots, and transmits a one-bit individual signal only in a slot among individual slots that is determined based on three-bit data as a portion of each carrier's ID data (step ST52).

More specifically, on receiving a response requesting command, data carrier DC1 transmits together with other carriers a one-bit common signal fixed for all data carriers in common slots of slots S1 to S8, and transmits a one-bit individual signal in an individual slot of its specific slot S1. On receiving a response requesting command, data carrier DC2 transmits a one-bit common signal fixed for all data carriers together with other carriers in common slots of slots S1 to S8, and transmits a one-bit individual signal in an individual slot of its specific slot S4. On receiving a response requesting command, data carrier DC3 transmits a one-bit common signal fixed for all data carriers together with other carriers in common slots of slots S1 to S8, and transmits a one-bit individual signal in an individual slot of its specific slot S3. And on receiving a response requesting command, data carrier DC4 transmits a one-bit common signal fixed for all data carriers together with other carriers in common slots of slots S1 to S8, and transmits a one-bit individual signal in an individual slot of its specific slot S5.

The reader/writer 1 transmits response halt commands to data carriers DC1 to DCn. The command containing identification signals for identifying destination data carriers, a data carrier receiving the command stops responding to subsequent response requesting commands (step ST53).

The response halt command transmitted by the reader/writer 1 being added with a new identification number, each of the data carriers DC1 to DCn is configured to, upon detection of a response halt request from the reader/writer 1, store a new identification number fixedly and use it as its identification number for subsequent transmission to the reader/writer 1.

Up to this point, a collision may have occurred and some data carriers may remain undetected. Therefore, the process from step ST51 to step ST53 is repeated (step ST54) with different three bits of the ID data being used for determining a slot.

When there is no transmission of common signals (step ST56) for the transmission of response requesting commands from the reader/writer 1 (step ST55), the presence of all the data carriers DC1 to DCn have been detected.

FIG. 6 shows a time chart for the processing above.

In the drawing, a time slot consists of an individual slot and a common slot, and common signals sent in common slots are transmitted regardless of whether or not there is an individual signal transmitted in a corresponding individual slot.

The following description assumes that the number of data carriers is four: n=4 (i.e. DC1 to DC4).

That is, in response to a read-command from the reader/writer 1, each of the data carriers DC1 to DC4 transmits a one-bit individual signal in an individual slot of a time slot which it has selected. Here, no data carriers share an individual slot of a single slot.

In such a manner, in each uplink time slot from data carriers DC1 to DCn to the reader/writer 1, common slots are provided in which all the data carriers DC1 to DCn continuously transmit a one-bit common signal of a certain value up to the last time slot, in addition to individual signals for only one of the data carriers DC1 to DCn to transmit. And since response from a data carrier whose presence has been recognized by the reader/writer 1 is stopped within the presence detection sequence by the response halt command at step ST53, the carrier does not transmit a response transmitting signal upon receiving a response requesting command at step ST55 in the next frame. Accordingly, by configuring the reader/writer 1 to determine that the presence of all data carriers have been detected when it is recognized that no signal from the data carriers DC1 to DCn has been detected in the first common slot, it is possible to reduce the time required to complete reading of data by the time for getting from the first slot to the last slot and thus to attempt the speed-up of processing.

Also, since the common signals in common slots should be transmitted continuously up to the last time slot if they are transmitted in the first time slot within a single transmission frame, the signals can be also used for detecting a trouble in communication such as communication between the reader/writer 1 and any of data carriers DC1 to DCn being in a disabled condition when the reader/writer 1 cannot detect a common signal.

Embodiment 4

Figure 7:
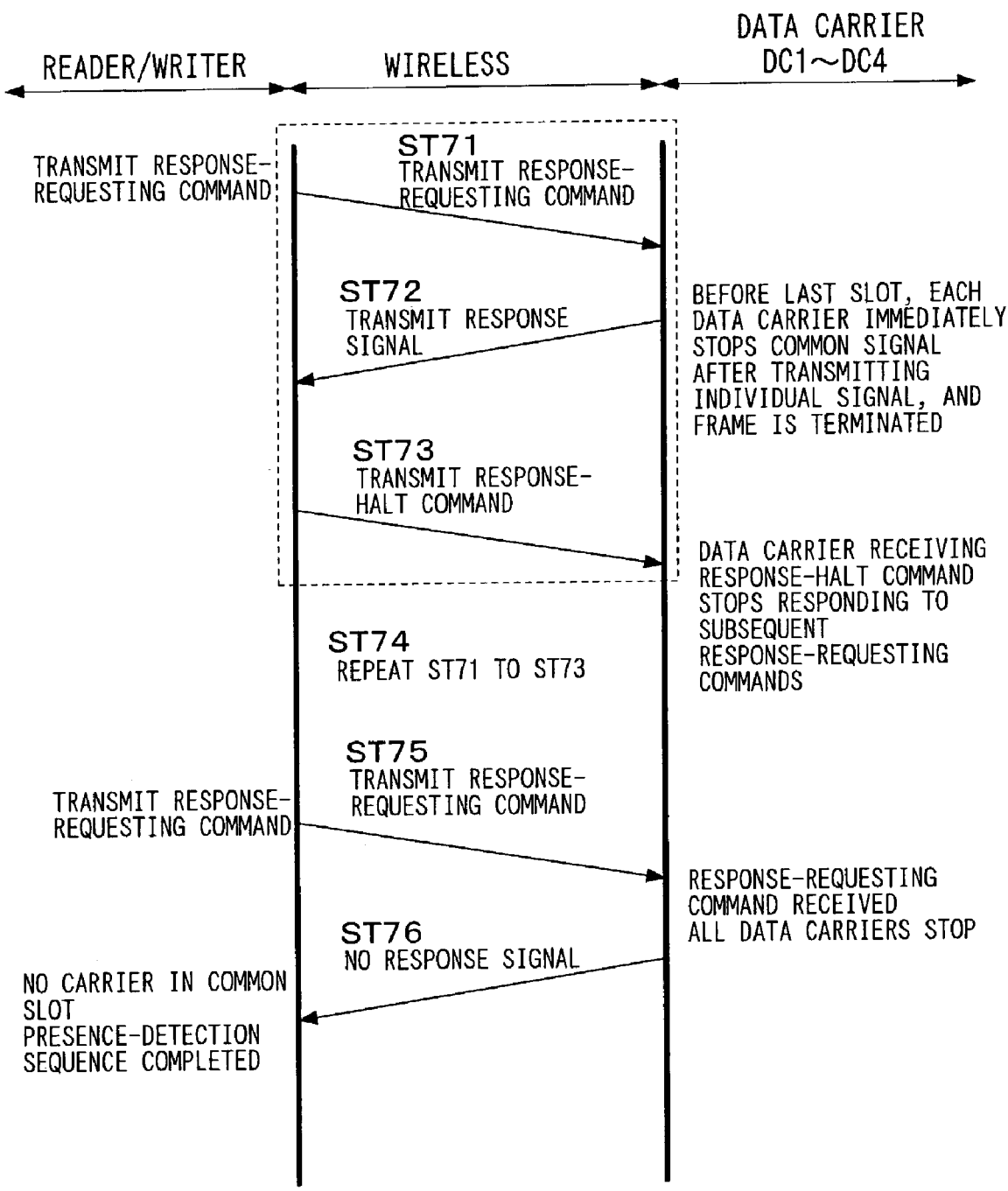
FIG. 7 is a flow chart illustrating operations of a reader/writer and a data carrier in embodiment 4 of the present invention.
Figure 8:
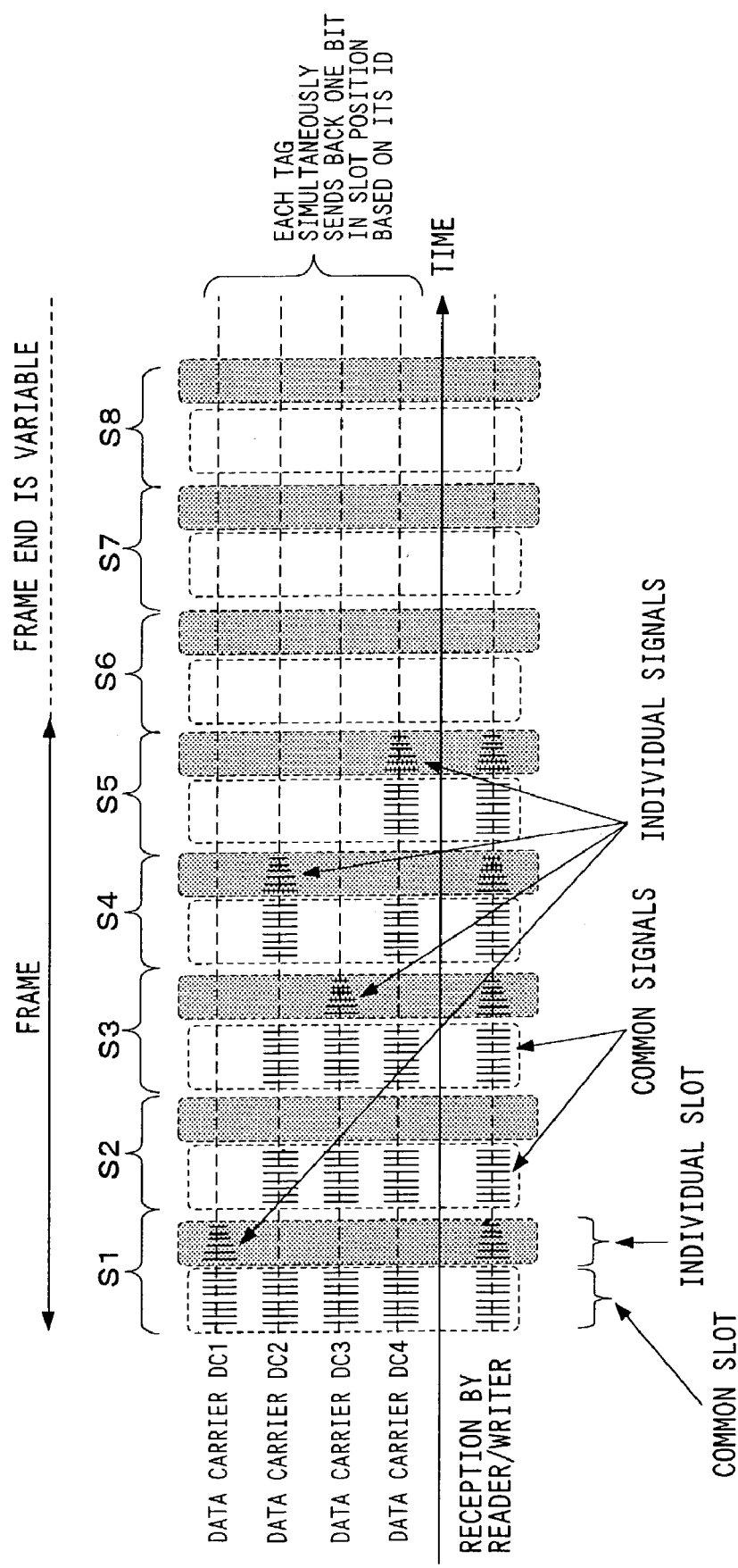
FIG. 8 shows a waveform illustrating an output from a reader/writer, and an output from each data carrier and its received data in identifying data carriers in embodiment 4.

FIGS. 7 and 8 show embodiment 4 of the present invention.

The basic configuration of the contactless communication system is the same as FIG. 1.

A contactless communication system using multiple data carriers, will be described with FIG. 7.

FIG. 7 shows a flow of an operation between the data carriers DC1 to DCn and the reader/writer 1 in the embodiment.

Each of the data carriers DC1 to DCn detects a response requesting command from the reader/writer 1 in a particular slot that is defined based on a portion of each carrier's identification information among slots S1 to S8 ordered in a frame, and transmits an individual signal in an individual slot section that is a portion of the particular slot, as well as transmits a common signal in a fixed common slot that is a different section from the individual slot section of the same particular slot and in common slot sections in slots between the beginning of the frame and the particular slot.

This operation is configured to repeat itself until a data carrier detects a response halt command to it from the reader/writer 1 after one frame.

The reader/writer 1 first broadcasts a response requesting command to each of the data carriers DC1 to DCn (step ST71). The command describes the number of time slots to be used according to the (expected) number of data carriers DC1 to DCn.

For easier understanding, it is assumed that each data carrier has ID data of 64 bits in total and three bit of the ID data is used for determining a slot, and eight slots exist. Also, each of the eight slots further consists of an individual slot and a common slot.

On receiving a response requesting command, each of the data carriers DC1 to DCn transmits a one-bit individual signal only in a slot among individual slots that has been determined based on three-bit data as a portion of each data carrier's ID data, and transmits simultaneously a one-bit common signal fixed for all data carriers in common slots up to a slot in which its individual signal is transmitted (step ST72).

In embodiment 3, data carriers DC1 to DCn are configured to transmit a common signal in common slots until just before a frame following the frame in which a response halt command of step S53 is detected after transmitting a response signal at step ST52, whereas data carriers DC1 to DCn in embodiment 4 are configured to, upon detection of a response requesting command of step ST71, also stop transmitting common signals in time slots after transmitting an individual signal, and a frame is terminated at that point.

The reader/writer 1 transmits response halt commands to the data carriers DC1 to DCn. The command contains an identification signal for identifying a destination data carrier, and a data carrier receiving it stops responding to subsequent response requesting commands (step ST73).

Data carriers DC1 to DCn are configured to detect the response halt request through the response halt command at step ST53 and store the identification number fixedly.

Up to this point, a collision may have occurred and some data carriers may remain undetected. Thus, the process from step ST71 to step ST73 is repeated (step ST74) with different three bits of the ID data being used for determining a slot. In repetition of the process, transmission of common signals in the uplink transmission frame to the reader/writer 1 does not remain ceased, but common signals are continuously transmitted from the first slot up to a time slot in which an individual signal is transmitted again.

The reader/writer 1 is configured to recognize that a frame is terminated and complete its reception immediately when it detects that no common signal has been transmitted from data carriers since it received the last individual signal without waiting until the last time slot, regardless of whether there has been any collision of individual signals by the time the last individual signal was received.

The reader/writer 1 is configured to determine that the presence of all data carriers DC1 to DCn has been detected with the absence of transmission of common signals (step ST76) in response to the response requesting commands transmitted by the reader/writer 1 (step ST75) if it has not detected any collision of signals by the time it receives the last individual signal.

FIG. 8 shows a time chart for the process above.

In the drawing, a time slot consists of an individual slot and a common slot, and each data carrier continues to transmit the common signal sent in common slots up to a time slot in which it transmits an individual signal.

Thus, embodiment 4 is configured such that common slots are provided in which each of the data carriers DC1 to DCn continuously transmits a one-bit common signal of a certain value up to a time slot it transmits an individual signal, in addition to individual signals in which only one of the data carriers DC1 to DCn transmits, and it is determined that the presence of all data carriers has been detected when no signal is transmitted from any of the data carriers DC1 to DCn in a common slot.

Specifically, the data carrier DC1 transmits a one-bit individual signal in the individual slot of its specific slot S1 in response to the response requesting command. The carrier DC1 transmits a one-bit common signal in the common slot of slot S1 and does not transmit the one-bit common signal in the common slots of slots S2 to S8.

The data carrier DC2 transmits a one-bit individual signal in the individual slot of its specific slot S4 in response to the response requesting command. The carrier DC2 transmits a one-bit common signal in the common slot of slot S4 and in common slots of slots S1, S2, and S3 between the detection of the response requesting command and slot 4, and does not transmit the common signal in the common slots of slots S5, S6, S7, and S8 after slot S4.

The data carrier DC3 transmits a one-bit individual signal in the individual slot of its specific slot S3 in response to the response requesting command. The carrier DC3 transmits a one-bit common signal in the common slot of slot S3 and in the common slots of slots S1 and S2 between the detection of the response requesting command and slot S3, and does not transmit the common signal in the common slots of slots S4, S5, S6, and S7 after slot S3.

And the data carrier DC4 transmits a one-bit individual signal in the individual slot of its specific slot S5 in response to the response requesting command. The carrier DC4 transmits a one-bit common signal in the common slot of slot S5 and in the common slots of slots S1, S2, S3, and S4 between the detection of the response requesting command and slot S5, and does not transmit the common signal in the common slots of slots S6, S7, and S8 after slot S5.

In such a manner, it is possible to reduce the time required to complete reading of data by a time corresponding to the elimination of a necessity to always wait until the last time slot and thus to attempt to speed-up processing.

Common slots in embodiments 3 and 4 are not limited to a position relative to the individual slot in each time slot, but may be set at other positions. For example, they may be set after individual slots. Various variations other than this can be made without departing from the scope of the present invention.

As has been described, according to the present invention, in a contactless communication system having multiple data carriers and an access device for accessing the data carriers, it is possible to reduce the time required to complete the identification of all data carriers that exist around the access device, thereby realizing an information reading system that can attempt to speed-up its processing.

What is claimed is:

1. A contactless communication system, comprising a plurality of data carriers, and an access device for accessing said data carriers, wherein
    each of said data carriers detects a response requesting command from said access device and sends back an individual response signal for one-bit information at a time ordered based on a portion of its identification information of said data carrier, and
    said access device monitors individual slots of said response signals and determines that detection of the presence of data carriers is completed when the access device has obtained individual signals from said data carriers.

2. A data carrier for use in a contactless communication system, wherein
    a response requesting command from an access device is detected and an individual signal for one-bit information at a time ordered based on a portion of the data carrier's identification information is transmitted.

3. The contactless communication system according to claim 1, wherein
    said access device monitors individual slots of said response signals and determines that detection of the presence of data carriers is completed when the access device has obtained individual signals from said plurality of data carriers, transmits a response halt request added with a new identification number that is generated based on information on a slot time for a response to a data carrier whose presence has been detected, and transmits the response request again to a data carrier whose presence has not yet been detected, and
    said data carriers detect said response halt request and store said identification number.

4. The data carrier for use in a contactless communication system according to claim 3, wherein
    said data carrier detects a response requesting command from an access device and transmits an individual signal for one-bit information at a time ordered based on a portion of identification information of said data carrier, and detects a response halt request added with a new identification number that is transmitted by said access device to a data carrier whose presence has been recognized with the individual signal and stores said new identification number.

5. A communication method for a contactless communication system, wherein an access device identifies and communicates with a plurality of data carriers in a communication area, comprising:
    detecting a response requesting command from said access device in each of said data carriers and sending back to said access devices an individual response signal for one-bit information at a time ordered based on a portion of its identification information of said data carriers; and
    monitoring individual slots of said response signals at said access device and determining that detection of the presence of data carriers is completed when the access device has obtained individual signals from each of said plurality of data carriers.

6. The communication method for a contactless communication system according to claim 5, wherein
    said access device transmits a response halt request that is added with a new identification number generated based on information on slot time for a response to a data carrier whose presence has been detected, and transmits said response request again to a data carrier whose presence has not been detected, and
    each of said data carriers detects said response halt request and stores said identification number.

* * * * *